United States Patent [19]

Beer

[11] Patent Number: 4,526,634

[45] Date of Patent: Jul. 2, 1985

[54] PROCESS AND APPARATUS FOR SEPARATING LAMINATED SHEETS

[75] Inventor: Michael W. Beer, Rotherham, England

[73] Assignee: Eurobond (1984) Limited, Chesterfield, England

[21] Appl. No.: 596,931

[22] Filed: Apr. 5, 1984

[30] Foreign Application Priority Data

Apr. 8, 1983 [GB] United Kingdom ............... 8309544

[51] Int. Cl.³ .......................................... B32B 31/18
[52] U.S. Cl. ...................................... 156/64; 156/344; 156/353; 156/584
[58] Field of Search .............. 29/426.3, 714; 156/64, 156/344, 353, 584; 225/100; 226/5; 270/52.5; 271/DIG. 2

[56] References Cited

U.S. PATENT DOCUMENTS

| | | | |
|---|---|---|---|
| 4,125,985 | 11/1978 | Laske | 156/344 X |
| 4,285,759 | 8/1981 | Allen et al. | 156/584 |
| 4,334,672 | 6/1982 | Felix | 270/53 |
| 4,410,262 | 10/1983 | Ariyama et al. | 271/DIG. 2 X |
| 4,474,368 | 10/1984 | Peter et al. | 271/DIG. 2 X |

FOREIGN PATENT DOCUMENTS

| | | | |
|---|---|---|---|
| 3002465 | 3/1982 | Fed. Rep. of Germany | 270/52.5 |
| 1586591 | 3/1981 | United Kingdom . | |

*Primary Examiner*—Robert Dawson
*Attorney, Agent, or Firm*—Harding, Earley, Follmer & Frailey

[57] ABSTRACT

Process for separating individual laminated sheets from a continuous web which comprises individual sheets located end to end with end portions overlapping and a continuous film laminated with each sheet and connecting the sheets together, the process including feeding the web in succession to a sensing station, a tear initiation station and a sheet separation station, the sensing station serving to sense the presence of successive overlapping end portions and thereafter actuating the tear initiation station to rupture the film at one edge thereof in the vicinity of a sensed overlapping portion and thereafter actuate the sheet separation station to propagate said rupture and thereby separate the terminal sheet from the web.

9 Claims, 8 Drawing Figures

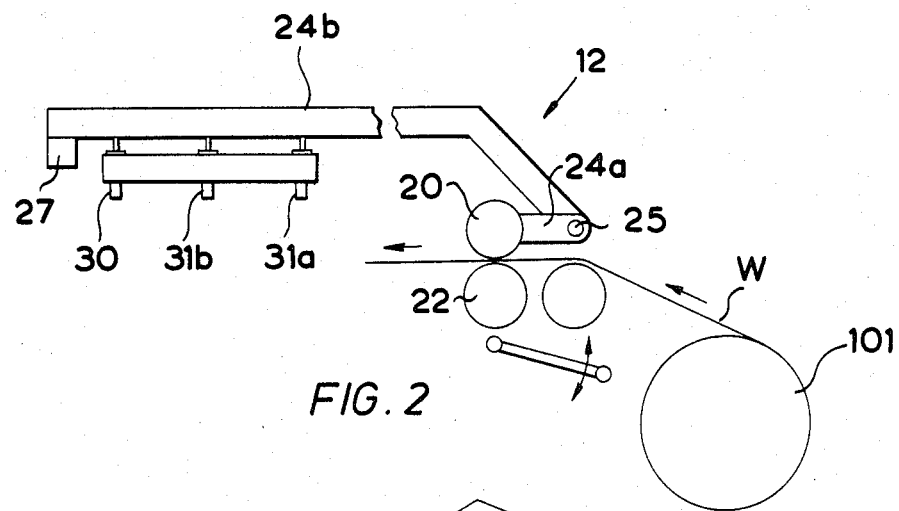
FIG. 2
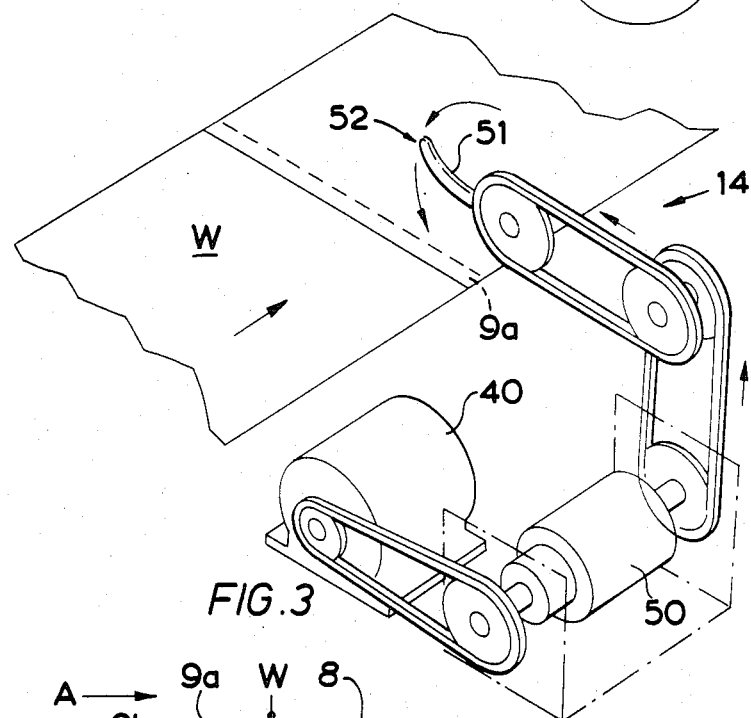
FIG. 3
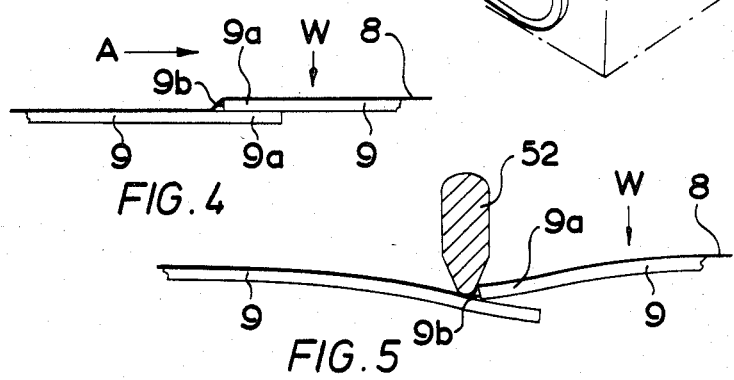
FIG. 4
FIG. 5

PROCESS AND APPARATUS FOR SEPARATING LAMINATED SHEETS

The present invention relates to the separation of laminated sheets, in particular, separation of individual printed sheets which are covered on one side and connected by a protective plastics film.

When producing for example carton blanks or book covers it is desirable in certain cases to cover at least one side of the blank or cover with a protective plastics sheet. This is normally done on a commercial scale by aligning the printed blanks end to end with marginal end portions overlapping to form a continuous string of blanks and then feeding the string of blanks through a laminating machine whereby a film of plastics material is continuously laminated onto one side of the string of blanks. Accordingly the string of blanks emerging from the laminating machine are connected to one another by the film and form a continuous laminated web which is either fed directly to a sheet separator or is wound into a roll for subsequent sheet separation treatment. If the blank or cover is to be covered on both sides with a plastics film, the separated sheets are processed again through the laminating machine to cover the other side and then the connected sheets are again separated.

It is a general aim of the present invention to provide an efficient and reliable process and apparatus for separating the laminated web into individual laminated sheets.

According to one aspect of the present invention there is provided a process for separating individual laminated sheets from a continuous web which comprises individual sheets located end to end with end portions overlapping and a continuous film laminated with each sheet and connecting the sheets together, the process including feeding the web in succession to a sensing station, a tear initiation station and a sheet separation station, the sensing station serving to sense the presence of successive overlapping end portions and thereafter actuating the tear initiation station to rupture the film at one edge thereof in the vicinity of a sensed overlapping portion and thereafter actuate the sheet separation station to propagate said rupture and thereby separate the terminal sheet from the web.

According to another aspect of the invention there is provided apparatus for separating individual laminated sheets from a continuous web which comprises individual sheets located end to end with end portions overlapping and a continuous film laminated with each sheet and connecting the sheet together, the apparatus including a sensing station through which the web is fed, the sensing station including sensing means for sensing the presence of successive overlapping end portions, a tear initiation station which is positioned to receive the web from the sensing station and which includes rupture means actuated by said sensing means to rupture the film at one edge thereof in the vicinity of a sensed overlapping portion, and a sheet separation station positioned to receive the web from the tear initiation station, the sheet separation station including separating means actuated by said sensing means to propogate the rupture created at the tear initiation station in order to separate the terminal sheet from the web.

Various aspects of the present invention are hereinafter described with reference to the accompanying drawings, in which:

FIG. 2 is a schematic side view showing the sensing station;

FIG. 3 is a schematic perspective view showing the tear initiation station;

FIGS. 4 and 5 are respective side views of overlapping end marginal portions shown prior to and during tear initiation;

The apparatus according to the present invention includes three distinct operating stations, viz, a sensing station 12 which functions to detect the overlapping marginal end portions of adjacent sheets, a tear initiation station 14 which serves to rupture the film and a separation station 16 which serves to pull the leading sheet in the longitudinal direction of the web and thereby propagate the tear initiated at station 14 and thereby separate the sheet from the web.

Figure 1:
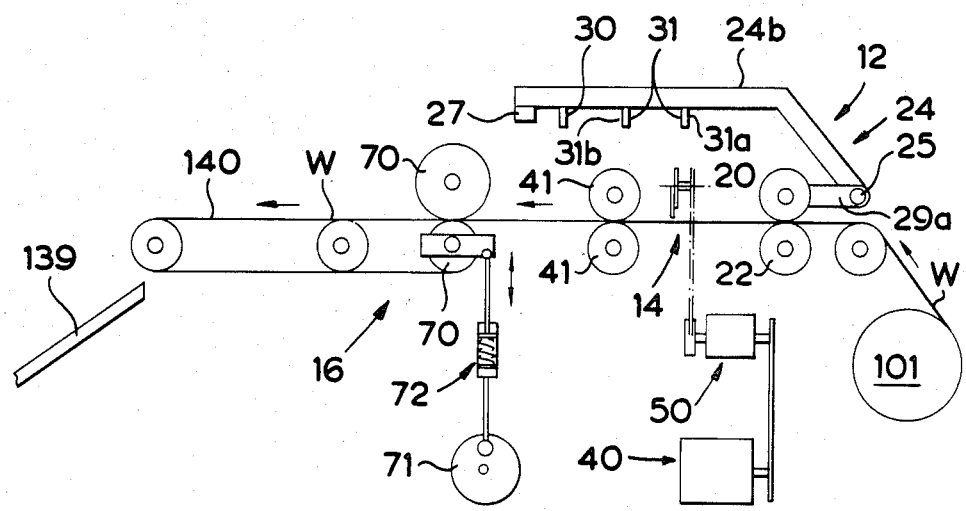
FIG. 1 is a diagrammatic side view of a separating apparatus according to the present invention.

As shown in FIGS. 1 and 2 the sensing station 12 includes a roller 20 which is movably mounted in the main frame (not shown) of the apparatus. A cranked sensing arm 24 is pivotally connected to the main frame at a fulcrum 25. One arm portion 24a is connected to and rotatably supports the roller 20 and the other arm portion 24b extends towards and rests upon a fixed stop 27. Accordingly upward movements of the roller 20 are translated by the arm portion 24a into upward movements of the arm portion 24b and the stop 27 also serves to support the roller 20 in a lowermost position. A conventional proximity sensor 30 for example as supplied by a West German Company called Captor is located adjacent to the stop 27 and the displacement of the arm portion 24b at this position is amplified in dependence on the relative distances of this position from the fulcrum and the distance of the roller 20 from the fulcrum. The positioning of the sensor 30 is such that when the roller 20 is displaced the arm portion 24b is moved sufficiently far away from the sensor 30 to enable the sensor's tuned circuit to oscillate. Thus when the arm portion 24b returns to its stop position its presence shunts the electric field associated therewith and thereby provides an actuating signal. In the illustrated embodiment, the distance from sensor 30 to the fulcrum is preferably 9 times that of the distance between the axis of roller 20 and the fulcrum. It will be appreciated that this may vary as desired. The roller 20 is positioned above a co-operating roller 22 which is movably mounted on the main frame so as to be movable toward and away from roller 20. The web of laminated sheets and film is fed between the rollers 20, 22. The roller 22 acts as a static base against which the roller 20 co-operates so that as the web is fed between the rollers 20, 22 roller 20 is caused to intermittently rise and fall about fulcrum 25 as the overlapping marginal end portions of adjacent sheets pass therebetween. Preferably the roller 20 extends across the full width of the web and so only responds when the overlapping portions pass thereunder and is not affected by creases in the sheets. In FIG. 4 the direction of feed of the web is illustrated by arrow A and it will be appreciated that initially the roller 20 experiences a gradual rise and as the overlapping marginal end portions 9a of adjacent sheets 9 pass thereunder and then a sudden fall as edge 9b passes thereunder. In the present embodiment the presence of edge 9b is sensed and so the sudden fall is used to generate an actuating signal. In the illustrated embodiment the web is wound into a roll 101 as it leaves the laminating machine. If the web were fed directly to the separating apparatus the web would travel in the opposite direction to arrow A and so the presence of edge 9b would be sensed by a sudden rise of roller 20.

Accordingly, in the illustrated embodiment, the proximity sensor 30 is arranged to produce an actuacting signal when the lever portion 24b returns into abutment with the stop 27. In order for the sensing station to accommodate differing thicknesses of sheet 9 it is necessary for the spacing between rollers 20, 22 to be adjusted so as to enable the sensor 30 to provide a meaningful signal. This amount of displacement is chosen so that the arm 24b is displaced sufficiently far away from the sensor but not far enough to make the arm portion bounce on hitting stop 27.

The amount of displacement of arm 24b is adjusted by adjusting the height of roller 22 relative to roller 20 so that for thicker materials the roller 22 is spaced further away from roller 20 than for thinner materials.

It is envisaged that two differing modes of adjustment of roller 22 may be adopted. The first mode is to adjust the distance between the rollers 20, 22 so that the arm 24b is displaced by the same amount for each differing thickness of sheet stock fed through the apparatus. This method requires accurate measurement of the displacement of the arm 24b each time the apparatus is adjusted to handle a different thickness of sheet stock. To this end several further proximity sensors 31 are provided spaced along the arm 24b. Since the amount of displacement of the arm 24b decreases towards the fulcrum, sensor 31a is used for providing a coarse adjustment of roller 22, sensor 31b is used for providing a medium adjustment and sensor 30 is used for providing a fine adjustment. This is achieved by adjusting the spacing between rollers 20, 22 whilst web is running through the apparatus and monitoring when sensors 30, 31a and 31b switch on and off. If all three sensors switch on and off the spacing is too small and so is progressively widened until sensors 31a and 31b are continually on and sensor 30 switches on and off.

Figure 7:
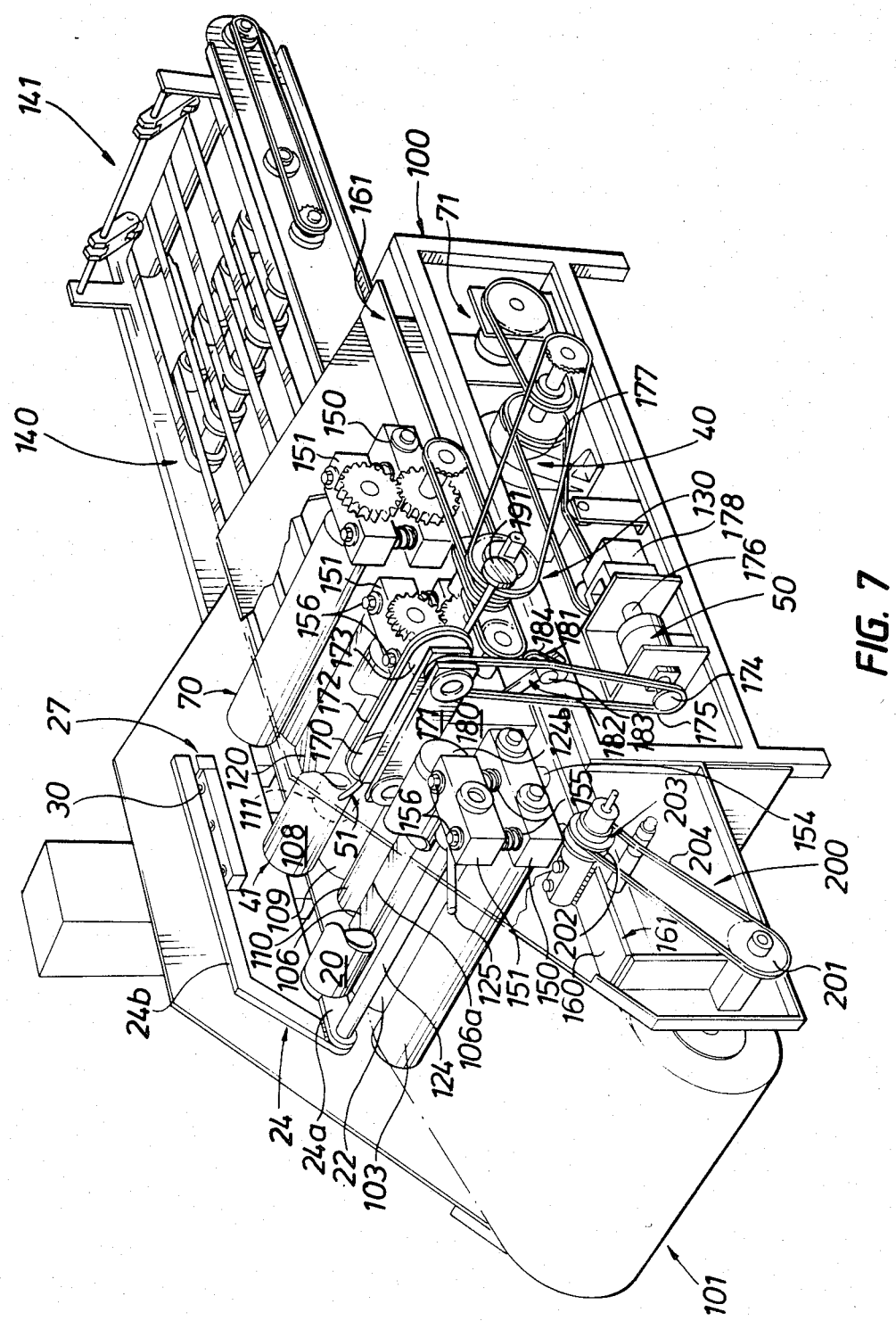
FIG. 7 is a more detailed perspective view, partly broken away, of an embodiment according to the present invention.
Figure 8:
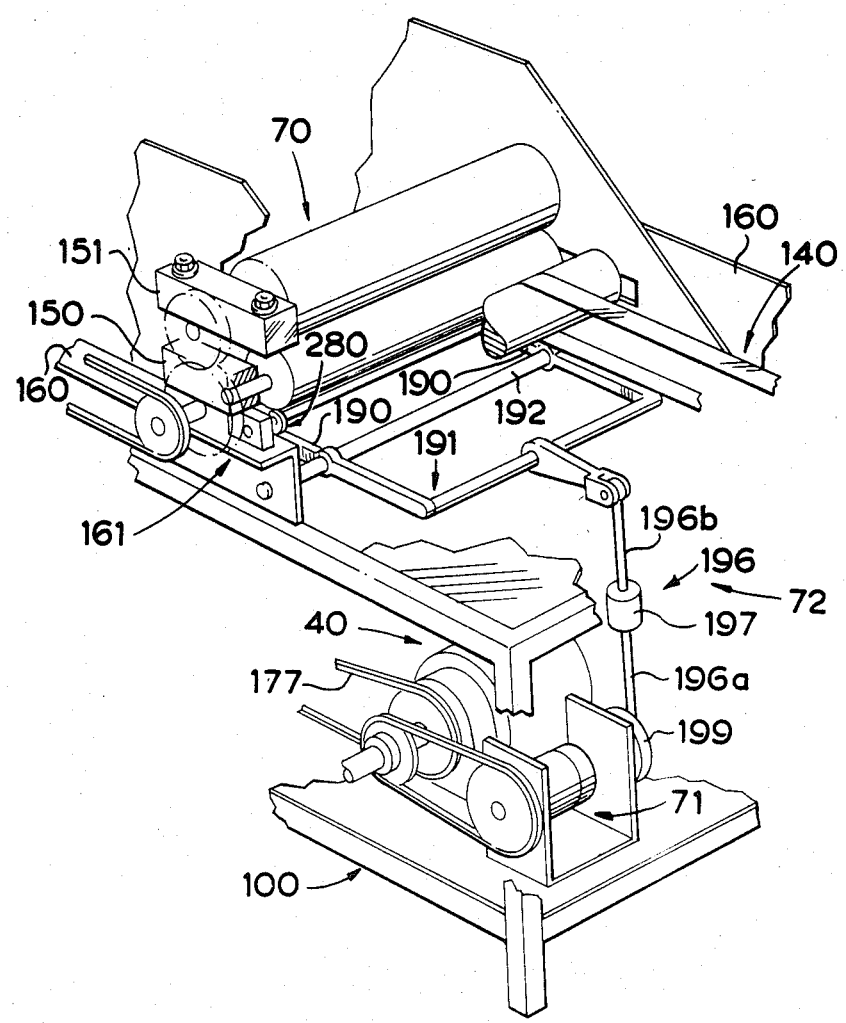
FIG. 8 is a broken away perspective view of the sheet separation of the apparatus shown in FIG. 7.

The other mode of adjustment envisaged, and which is specifically described later with reference to FIGS. 7 and 8, is to initially set the apparatus so that the space between rollers 20, 22 is equal to the thickness of the sheet stock and covering film, plus a clearance gap which is equal to or less than the thickness of the thinnest sheet stock to be encounted.

The space between rollers 20, 22 is thereby made up of a variable factor (i.e. the thickness of the sheet stock and covering film) and a constant factor (i.e. the clearance gap). For subsequent adjustment of the apparatus to accommodate a different thickness of sheet stock roller 22 is moved so that the variable factor equals the new thickness of sheet stock and covering film. A method of achieving this is described later with reference to FIGS. 7 and 8. Accordingly the amount by which the roller 20 (and hence arm 24b) rises and falls differs for differing thicknesses of sheet stock but it has been found that for the range of sheet stock sizes (say 0.002" to 0.0625") likely to be encountered the range of differing displacements of the arm 24b may be arranged to fall within the range of sensitivity of sensor 30 by suitable choice of said clearance gap and position of sensor 30 from the fulcrum.

The web of material is fed through the apparatus using a motor 40 which is arranged to drive the web at a constant linear speed via a pair of nip rollers 41. The nip rollers 41 positively nip the web at all times and are preferably made so as to have resilient surfaces which accommodate passage of the overlapping marginal portions. Accordingly when the sensing station has detected overlapping marginal end portions the actuation signal is used to activate a one revolution clutch 50, also connected to motor 40, which drives a striking arm 51 so as to undergo a single revolution. The striking arm 51 is located to one side of the web and is arranged so that the path of travel of its striking head 52 intersects with the normal path of travel of a side portion of the web. The rate of movement of the head 52, the amount of downward deflection of the overlapping portions 9a caused by the head and the shape of the head are chosen so as to result in the rupture of the film 8 at one side thereof in the vicinity of edge 9b of the uppermost sheet 9. This is illustrated schematically in FIGS. 4 and 5 wherein FIG. 4 shows the overlapping portions 9a prior to deflection and FIG. 5 shows the overlapping portions 9a during deflection. Once the head has initially penetrated the film it moves toward the edge of the film and thereby creates a tear in the film which extends inwardly from one edge thereof. It has been found that by suitable choice of the above variables it is possible to rupture film without cutting or tearing the sheet stock even when the sheet stock is weaker than the film e.g. in cases where the sheet stock is thin and/or is wet.

In a typical set up the head 52 rotates at about 200 r.p.m. and the paper web speed is approximately 4,000 ft. per hour.

The sensor 30 is electrically connected to a dual delay circuit based on an i.e. chips type 556. The circuit is activated by a signal from sensor 30 and produces a first delayed signal which is delayed by a predetermined amount in order to permit the overlapping portions 9a to reach the striking arm 51 before its activation. It has been found that the accuracy of the first delay signal is not too critical since rupture of the film 8 occurs providing the striking head strikes the film in proximity to the edge 9b, i.e. providing the edge 9b is located within that area of web which is downwardly deflected. Since the tear initiation station 14 is dependant of the sensing station 12 sensing the presence of an edge 9b of the overlapping portions 9a it will be appreciated that the apparatus automatically handles sheets 9 of differing lengths and situations where the amount of overlap between adjacent sheets varies.

Figure 6:
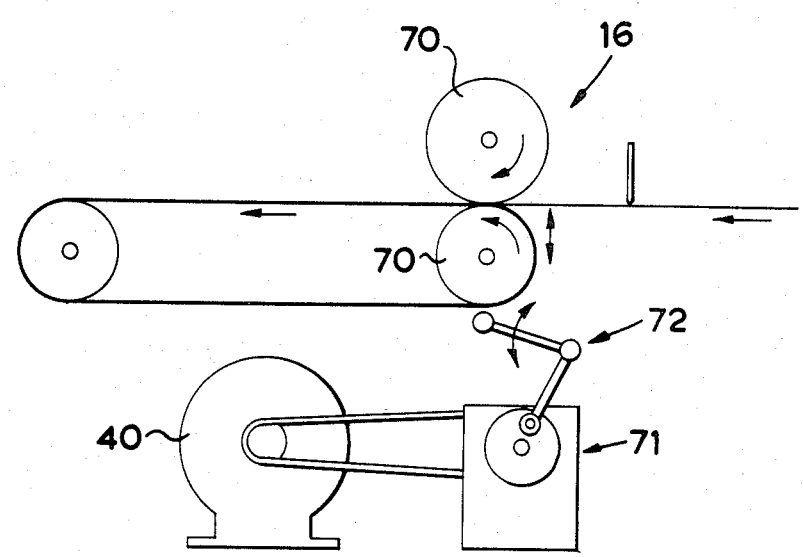
FIG. 6 is a schematic side view of the sheet separation station.

When the web has been ruptured at the tear initiation station, the ruptured portion subsequently passes through the nip rollers 41 and is fed thereby toward the separation station 16. As seen in FIG. 6 the separation station includes a pair of nip rollers 70 which are normally spaced apart so as not to contact the film covered sheet stock 9 but they are intermittently actuated to nip the sheet located therebetween. Both rollers 70 are positively driven by motor 40 so as to have a peripheral speed greater than that of the linear speed of the web. Accordingly when the rollers 70 are actuated to nip the sheet located therebetween a pulling force is exerted on the web positioned between rollers 41 and rollers 70 which tends to propagate the ruptured film and thereby result in separation of the leading sheet from the web. The separated sheet is then fed via a conveyor 140 to a collection tray 139. The distance between the nip rollers 41 and rollers 70 is chosen so as to be less than the shortest length of sheet stock likely to be encountered so as to ensure that at any one time there is only one ruptured portion located between rollers 41 and rollers 70. The delay circuit produces a second delayed signal which is delayed by a longer duration than the first delayed signal to create actuation of a single revolution clutch 71 which operates a mechanism 72 for lifting the lower roller 70 to a nip position with the upper roller 70. A more detailed mechanism 72 is described later with reference to FIGS. 7 and 8.

A specific example of an apparatus embodying the present invention is illustrated in FIG. 7. In the embodiment of FIG. 7 parts similar to those illustrated in FIGS. 1 and 6 have been designated the same reference numerals.

The apparatus illustrated in FIGS. 7 and 8 includes a main frame 100 on which is mounted at one end the roll 101 of laminated sheets to be separated. A brake mechanism 200 is provided for creating a drag on the roll 101 so that the web is placed under tension as it is pulled from the roll 101 by the nip rollers 41. The brake mechanism illustrated includes a sprocket wheel 201 arranged to be driven by the roll 101 and a sprocket wheel 202 which is acted upon by a frictional brake 203 which is adjustable to vary the resistance to rotation of sprocket 202. A chain 203 connects sprockets 201, 202. A feed roller 103 is provided which feeds the web between rollers 20, 22. Downstream of rollers 20, 22 there is provided a support plate 106 which supports the web in its passage to the nip rollers 41. The nip rollers 41 include a pair of co-operating rollers 108, 109 which positively nip the web for feeding the web through the apparatus and a feed roller 110 immediately upstream of rollers 108, 109 for feeding and guiding the web to the rollers 108, 109 and a feed roller 111 immediately downstream of rollers 108, 109 for guiding the web in its passage away from rollers 108, 109.

Rollers 103, 108, 110, 111 are all driven at the same peripheral speed by the motor 40 via a common chain drive 130. The chain drive to roller 103 is not shown in FIG. 7 as it is located on the opposite side of the frame 100.

A support plate 120 is provided downstream of roller 111 and serves to support and guide the web in its passage to the separating rollers 70. Immediately downstream of rollers 70 there is provided the belt conveyor 140 which serves to convey separated sheets away from the separating rollers 70 to a discharge station 141 whereat the separated sheets are conveniently discharged into a collection tray (not shown).

Rollers 103 and 22 are rotatably mounted at each end in a bearing block 150 (only one of which is visible in FIG. 7). An associated bearing block 151 is located above each bearing block 150 and the pair of blocks 151 serve to rotatably receive fulcrum shaft 124. The sensing arm 24 is fixedly secured to the shaft 124, the roller 20 being rotably supported between arm portion 24a and a further arm 124b which is also fixedly secured to the shaft 124. A lever 125 is conveniently attached to the shaft 124 so as to enable the shaft 124 to be manually rotated for lifting roller 20 which is useful during initial feeding of the web into the apparatus.

Both associated bearing blocks 150, 151 are slidably received on a pair of shafts 154 which extend upwardly from the longitudinally extending frame member 161 (the frame member 161 on the far side of the apparatus not being visible). Springs 155 are located on the shafts 154 and positioned between associated blocks 150, 151 for biasing them apart, the upper bearing block 151 being urged against bolt heads 156.

Accordingly the height of each block 151 above the frame members 161 may be adjusted by raising or lowering bolt heads 156. This adjustment enables the shaft 124 (and accordingly roller 20) to be accurately aligned to be parallel with roller 22.

As indicated earlier, in order to accommodate different thicknesses of sheet stock the roller 22 is raised or lowered relative to the roller 20. This is achieved by providing a cam (not shown) which is rotatably mounted on the lower bearing block 150 and is arranged to slidingly contact the upper face 160 of the associated frame member 161. Thus rotation of the cam causes the bearing block 150 to rise or fall relative to frame member 161. In order to ensure that the roller 22 rises or falls whilst maintaining the same alignment with roller 20, the cams of each lower block 150 in which roller 22 is mounted are mounted on a common shaft (not shown) extending across the width of the apparatus. Thus after initial setting of the cams the roller 22 will maintain its alignment.

Similarly pairs of associated bearing blocks 150, 151 are used for mounting rollers 108, 109, 110, 111 and the pair of separating rollers 70, the lower bearing block 150 of each pair including a cam for height adjustment of the lower block 150.

Advantageously, all the shafts carrying the adjusting cams are rotably connected by a chain transmission (not visible as it is located on the far side of the apparatus) so that by rotating one cam shaft, all cams rotated by the same amount. Thus when adjusting the apparatus to accept a different thickness of sheet stock it is possible to carry out the adjustment operation on one set of rollers, usually the nip rollers 108, 109, and the other co-operating rollers 20, 22 and the separating rollers 70 will automatically be adjusted as previously mentioned.

The striking arm 51 is mounted on a wheel 170 which is rotatably mounted on a frame 171. The wheel 170 is rotatably driven by a chain 172 which is in turn driven by a sprocket 173 also rotatably mounted on frame 171. The sprocket 173 is driven via a chain 175 driven by the output sprocket 174 of the one revolution clutch 50. The input shaft 176 to the clutch 50 is continuously driven by motor 40 via chain 177 and gear box 178. The clutch 50 is preferably a conventional clutch as supplied by Warner Electric Corporation, U.S.A.

The frame 171 is slidably mounted on a support 180 and a threaded shaft 190 turned by a hand wheel 191 is provided for moving the frame 171 relative to the support 180 so that the position of the rotatable striking arm 51 relative to the edge of the web may be adjusted either whilst the apparatus is running or stopped. In this way the position of entry of the striking arm into the web may be varied in order to accommodate for the position of the side edge of the web running through the machine and also to alter the amount of time taken for the striking arm to pass through and out of the web. In order to maintain chain 175 under tension when adjusting the position of frame 171 a tensioning device 181 is provided. The tensioning device 181 includes a pivoted lever 182 which is pivoted at one end to frame 171 and rests upon the edge of member 161. A roller 183 is mounted on arm 184 which is in turn mounted on the lever 182. The arm 184 is adjusted relative to arm 182 so that roller 183 bears against the chain 175 to take up slack. When the frame 171 is moved the arm 182 rises or falls due to its abutment with edge of member 161 and in so doing maintains the roller 183 in contact with the chain 175.

The downstream edge 106a of support plate 106 is spaced from the uppermost periphery of roller 110 to define therebetween a pocket into which the laminated sheet stock is deformed when struck by striking arm 51. Accordingly the striking arm 51 is positioned above said pocket so that during rotation of wheel 170 it passes through the pocket.

As shown in FIG. 8, the adjustment cam 280 associated with each bearing block 150 (only the adjustment cam of the nearest bearing block 150 being visible) is supported on a respective arm 190 of a bifurcated bracket 191. The bracket 191 is pivotally supported on the frame 100 by means of a shaft 192. The bracket 191 is connected to the one revolution clutch 71 via a connection rod assembly 196. The clutch 71 is of the same type as clutch 50 and is continuously driven by the motor 40 and is activated to drive its output shaft (not shown) through one revolution as determined by the delayed actuation signal. A disc 199 is mounted on the output shaft of the clutch 71 and a rod 196a of the assembly 196 is eccentrially mounted thereon. The rod 196a is connected to rod 196b via a resilient connection 197 so that during revolution of the disc 199 the arms 190 are caused to rise to bring rollers 70 into a nip condition, and then subsequently fall to again space the rollers 70 apart. The resilient connection 197 serves to allow rods 196a, 196b to move axially relative to one another during movement of the disc and thereby prevent excessive nip between rollers 70 and also protect the clutch output shaft from excessive loadings.

It is envisaged that the above apparatus may be used in conjunction with our laminating machine as described in our U.K. Pat. No. 1586591.

I claim:

1. Process for separating individual laminated sheets from a continuous web which comprises individual sheets located end to end with end portions overlapping and a continuous film laminated with each sheet and connecting the sheets together, the process including feeding the web in succession to a sensing station, a tear initiation station and a sheet separation station, the sensing station serving to sense the presence of successive overlapping end portions and thereafter actuating the tear initiation station to rupture the film at one edge thereof in the vicinity of a sensed overlapping portion and thereafter actuate the sheet separation station to propagate said rupture and thereby separate the terminal sheet from the web.

2. Process according to claim 1 wherein the sheet separtion station propagates said rupture by pulling the end sheet away from the web.

3. Apparatus for separating individual laminated sheets from a continuous web which comprises individual sheets located end to end with end portions overlapping and a continuous film laminated with each sheet and connecting the sheets together, the apparatus including a sensing station through which the web is fed, the sensing station including sensing means for sensing the presence of successive overlapping end portions, a tear initiation station which is positioned to receive the web from the sensing station and which includes rupture means actuated by said sensing means to rupture the film at one edge thereof in the vicinity of a sensed overlapping portion, and a sheet separation station positioned to receive the web from the tear initiation station, the sheet separation station including separating means actuated by said sensing means to propagate the rupture created at the tear initiation station in order to separate the terminal sheet from the web.

4. Apparatus according to claim 1 wherein the sensing means includes a roller movably mounted above a co-operating roller, the web being fed between the rollers and the spacing between the rollers being greater than the thickness of a single laminated sheet but less than twice the thickness of a single laminated sheet.

5. Apparatus according to claim 4 wherein the movably mounted roller extends across the full width of the web.

6. Apparatus according to claim 5 wherein the movably mounted roller is pivotally mounted and is attached to an arm which amplifies the displacement of the roller.

7. Apparatus according to claim 3 wherein the rupture means comprises a curved blade which is mounted for intermittent rotation adjacent to said edge of the film so that its path of travel intersects the path of travel of the web.

8. Apparatus accordiing to claim 3 wherein the tear initiation station includes a first pair of nip rollers which grip the web and positively feed the web to and from the tear initiation station.

9. Apparatus according to claim 8 wherein the tear propagation station includes a second pair of nip rollers which are actuated by said sensing means to move between web engaging and web disengaging positions, the second pair of nip rollers being driven at a higher peripheral speed than said first pair of nip rollers so that when said second pair of nip rollers engage the web they exert a pulling force which propagates the ruptured film and separates the terminal sheet from the web.

* * * * *